US010042829B2

(12) United States Patent
Durbin et al.

(10) Patent No.: US 10,042,829 B2
(45) Date of Patent: Aug. 7, 2018

(54) MEASUREMENT OF VISIBILITY OF OVERLAY CONTENT

(71) Applicant: Google Inc., Mountain View, CA (US)

(72) Inventors: Robert Durbin, Marina del Rey, CA (US); Justin Lewis, Marina del Rey, CA (US)

(73) Assignee: Google LLC, Mountain View, CA (US)

( * ) Notice: Subject to any disclaimer, the term of this patent is extended or adjusted under 35 U.S.C. 154(b) by 18 days.

(21) Appl. No.: 15/238,402

(22) Filed: Aug. 16, 2016

(65) Prior Publication Data

US 2017/0371853 A1  Dec. 28, 2017

Related U.S. Application Data

(60) Provisional application No. 62/355,531, filed on Jun. 28, 2016.

(51) Int. Cl.
| | |
|---|---|
| *G06F 17/00* | (2006.01) |
| *G06F 17/22* | (2006.01) |
| *G06F 17/21* | (2006.01) |
| *G06F 17/30* | (2006.01) |
| *H04L 12/26* | (2006.01) |
| *H04L 29/08* | (2006.01) |

(52) U.S. Cl.
CPC ........ *G06F 17/2247* (2013.01); *G06F 17/212* (2013.01); *G06F 17/3089* (2013.01); *H04L 43/06* (2013.01); *H04L 67/10* (2013.01)

(58) Field of Classification Search
CPC ............................. G06F 17/212; G06F 17/2247
USPC ........................................................ 715/205
See application file for complete search history.

(56) References Cited

U.S. PATENT DOCUMENTS 8,381,123 B2 * 2/2013 Karas .................... G06F 3/0485
715/786
8,812,561 B2 * 8/2014 Guido .................. G06F 17/241
707/769
(Continued)

FOREIGN PATENT DOCUMENTS

WO   WO-2013/178805 A2   12/2013

OTHER PUBLICATIONS

Nebeling et al., Metrics for the Evaluation of News Site Content Layout in Large-Screen Contexts;, ACM 2011, pp. 1511-1520.*
(Continued)

*Primary Examiner* — Cong-Lac Huynh
(74) *Attorney, Agent, or Firm* — Foley & Lardner LLP

(57) ABSTRACT

Systems and methods of measuring the visibility of overlay content in a display of a computing device are provided. A page renderer can identify a position of a video block with respect to a web page rendered on the client device, identify a portion of the web page visible in a viewport of the client device, identify a portion of the video block visible in the viewport, and pass data identifying the portion of the video block visible in the viewport to an element renderer. The element renderer can receive the data, identify a position of overlay content with respect to the video block, compare the position of the overlay content to the portion of the video block visible in the viewport to determine visibility of the overlay content in the viewport, determine whether the visibility meets a visibility threshold, and provide visibility data to a records server.

18 Claims, 8 Drawing Sheets

(56) References Cited

U.S. PATENT DOCUMENTS

| | | | | |
|---|---|---|---|---|
| 8,849,063 | B2* | 9/2014 | Takahashi | H04N 5/23293 |
| | | | | 348/E5.058 |
| 8,978,075 | B1* | 3/2015 | Kaiser | H04N 5/44 |
| | | | | 725/105 |
| 9,032,430 | B2* | 5/2015 | Ellis | H04N 5/44591 |
| | | | | 725/28 |
| 9,218,782 | B2* | 12/2015 | Omprakash | G09G 5/003 |
| 9,275,016 | B1* | 3/2016 | Freund | G06F 17/211 |
| 9,785,398 | B2* | 10/2017 | Wheatley | H04N 21/472 |
| 9,865,005 | B1* | 1/2018 | Pottjegort | G06Q 30/0246 |
| 2011/0028207 | A1* | 2/2011 | Gagner | G07F 17/32 |
| | | | | 463/25 |
| 2011/0055023 | A1 | 3/2011 | McNeeley et al. | |
| 2011/0082755 | A1 | 4/2011 | Itzhak | |
| 2013/0198608 | A1* | 8/2013 | Krassner | G06F 17/2247 |
| | | | | 715/234 |
| 2015/0040008 | A1* | 2/2015 | Redenshek | G01R 33/4814 |
| | | | | 715/719 |
| 2015/0278172 | A1 | 10/2015 | Tupil et al. | |
| 2018/0025752 | A1* | 1/2018 | Patel | G11B 27/036 |

OTHER PUBLICATIONS

Snoek et al., Mutimedia Event-based Video Indexing Using Time Intervals, IEEE 2005, pp. 638-647.*

International Search Report and Written Opinion in PCT/US2016/069591 dated Mar. 23, 2017.

* cited by examiner

MEASUREMENT OF VISIBILITY OF OVERLAY CONTENT

RELATED APPLICATIONS

The present application claims the benefit of and priority to U.S. Provisional Application No. 62/355,531, entitled "Measurement of Visibility of Overlay Content," filed Jun. 28, 2016, the entirety of which is hereby incorporated by reference.

BACKGROUND

A client device can render a web page for display on a monitor or screen of the client device. The client device often only displays a portion of the rendered web page in the finite display area of the monitor. The web page may contain one or more nested elements or frames such as a video player. The video player may, from time to time, display overlay content over a portion of the video. In some cases it may be desirable to measure whether or not the client device has displayed an overlay content item on the monitor.

SUMMARY

At least one aspect is directed to a system for detecting a position of content within nested frames in a computer display. The system can include a page renderer executed by a processor of a client device and an element renderer executed by the processor of the client device and in communication with the page renderer. The page renderer can be configured to render a web page including a video block on the client device, determine a position of the video block with respect to the web page, determine a portion of the web page visible in a viewport of the client device, calculate a portion of the video block visible in the viewport based on the position of the video block and the portion of the web page visible in the viewport, and pass data identifying the portion of the video block visible in the viewport to the element renderer. The element renderer can be configured to receive, from the page renderer, the data identifying the portion of the video block visible in the viewport, determine a position of an overlay content item with respect to the video block, calculate a portion of the overlay content item visible in the viewport by comparing the position of the overlay content item and the portion of the video block visible in the viewport, and transmit an identification of the portion of the overlay content item visible in the viewport and a timestamp to a remote server for recording an identification of overlay content item visibility.

In some implementations, the video block can host an immersive video. In such implementations, the element renderer can be configured to determine a position of the overlay content item with respect to the immersive video, determine a portion of the immersive video visible in the video block, and calculate a portion of the overlay content item visible in the viewport by comparing the position of the overlay content item with respect to the immersive video, the portion of the immersive video visible in the video block, and the portion of the video block visible in the viewport.

In some implementations, the page renderer can be configured to generate a first identifier and transmit it to the remote server, and the element renderer is configured to generate a second identifier and transmit it to the remote server, the remote server combining visibility data from the page renderer and the element renderer based on matching the first identifier and the second identifier.

In some implementations, the page renderer and the element renderer can execute instructions enabling each to identify the other.

In some implementations, the remote server can classify a visibility event as one of a plurality of predetermined classifications depending on the value of the measurement of overlay content item visibility.

In some implementations, the remote server can record an overlay content item view if the value of the measurement of overlay content item visibility exceeds a predetermined threshold.

In some implementations, the system can include a visibility calculator executed by the processor, configured to calculate visibility ranges based on the portion of the overlay content item visible in the viewport.

In some implementations, the system can include a local storage device configured to record a position of the outside of the page with respect to the viewport.

In some implementations, the system can include a page communicator executed by the processor, configured to communicate data between the page renderer and the element renderer.

In some implementations, the system can include an external communicator configured to transmit the data identifying the portion of the overlay content item visible in the viewport and the timestamp to the remote server.

At least one aspect is directed to a method of detecting a position of content within nested frames in a computer display. The method can include rendering, by a page renderer executed by a processor of a client device, a web page including a video block. The method can include determining, by the page renderer, a position of the video block with respect to the web page. The method can include determining, by the page renderer, a portion of the web page visible in a viewport of the client device. The method can include calculating, by the page renderer, a portion of the video block visible in the viewport based on the position of the video block and the portion of the web page visible in the viewport. The method can include passing, by the page renderer to an element renderer executed by the processor of the client device, data identifying the portion of the video block visible in the viewport. The method can include receiving, by the element renderer from the page renderer, the data identifying the portion of the video block visible in the viewport. The method can include determining, by the element renderer, a position of an overlay content item with respect to the video block. The method can include calculating, by the element renderer, a portion of the overlay content item visible in the viewport by comparing the position of the overlay content item and the portion of the video block visible in the viewport. The method can include transmitting, by the element renderer, an identification of the portion of the overlay content item visible in the viewport and a timestamp to a remote server for recording an identification of overlay content item visibility.

In some implementations, the video block can host an immersive video. In such implementations, the method can include determining, by the element renderer, a position of the overlay content item with respect to the immersive video. The method can include determining, by the element renderer, a portion of the immersive video visible in the video block. The method can include calculating, by the element renderer, a portion of the overlay content item visible in the viewport by comparing the position of the overlay content item with respect to the immersive video, the portion of the immersive video visible in the video block, and the portion of the video block visible in the viewport.

In some implementations, the method can include generating, by the page renderer, a first identifier and transmit it to the remote server; and generating, by the element renderer, a second identifier and transmit it to the remote server, the remote server combining visibility data from the page renderer and the element renderer based on matching the first identifier and the second identifier.

In some implementations, the method can include calculating, by a visibility calculator executed by the processor, visibility ranges based on the portion of the overlay content item visible in the viewport.

In some implementations, the method can include recording, by a local storage device of the client device, a position of the outside of the page with respect to the viewport.

In some implementations, the method can include communicating, by a page communicator executed by the processor, data between the page renderer and the element renderer.

In some implementations, the method can include transmitting, by an external communicator executed by the processor, the data identifying the portion of the overlay content item visible in the viewport and the timestamp to the remote server.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
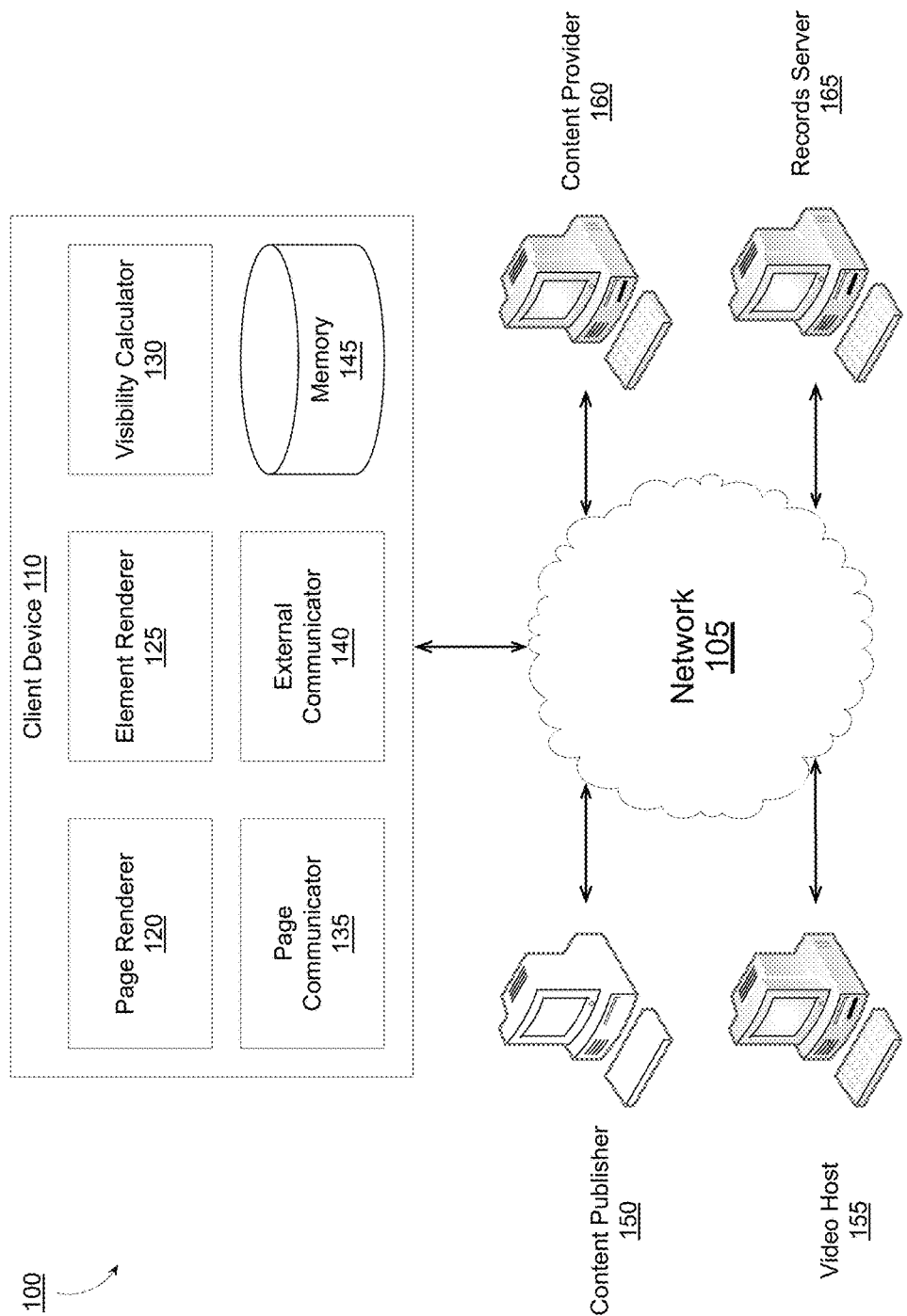
FIG. 1 is a block diagram depicting an example environment for measurement of visibility of overlay content, according to an illustrative implementation.

The present disclosure is generally directed to systems and methods of measuring visibility of overlay content in a display of a computing device. Overlay content can include third-party content such as an image or video displayed over first-party content such as embedded video. The embedded video can be displayed within a video player or video block in a web page rendered by a computing device. The portion of the rendered web page visible in the display of the computing device can be referred to as the viewport. Measuring whether an overlay content item is visible in the viewport can provide useful information to the publisher of the web page, the provider of the overlay content, and others. Measuring visibility, however, presents technical challenges stemming from factoring in the relative positions of the overlay content, the embedded video, the video player, and the web page with respect to the viewport.

Video content can provide a good platform for displaying third-party content because of the high engagement of users with the video content. Third-party content can be displayed with the first-party content (e.g., the hosted video) in several formats including in-line content and overlay content. In-line content can be displayed in place of the video content for a finite period of time in a manner analogous to a news flash, emergency broadcast, or commercial displayed during a traditional television broadcast. Overlay content can be displayed on top of video content. Overlay content can include picture-in-picture video, a pop-up notification, or banner ad.

In some cases it may be desirable to measure the visibility of overlay content in the viewport of the client device. However, because overlay content is typically delivered to a client device buried in cross-domain iframes, it can be difficult to detect whether rendered overlay content has actually been made visible on a display of the client device. The following example can illustrate the technical challenge of measuring visibility of third-party content. A content publisher can provide a web page or other online resource to the client device. The web page can include an embedded video player or video block. A video host may provide video content for display in the video block. The video content may or may not have the same aspect ratio as the video block. If the aspect ratio of the video content differs from the video block, the video block may include empty or "dead" space above and below, or on either side of, the video content. As a result, it is possible for the entire video to be visible in the display even if the entire video block is not. Therefore, the content publisher may not be able to determine with complete accuracy whether the entire video is visible in the display. By extension, the content publisher may not be able to accurately determine the visibility of in-line content, which may have an aspect ratio different from both the video block and the primary video content. In the case of in-line content, the content publishing computing device, however, can effect a compromise whereby all primary video content and in-line content are centered in the video block. That way, the content publisher can apply a 50% criteria: if 50% of the video block is visible in the display, then 50% of the in-line content or hosted video is visible. The 50% criteria is agnostic to the respective aspect ratios of the hosted video and the in-line content.

The visibility of overlay content, however, can be more difficult to measure. In addition to the dead space problem presented by in-line content, overlay content can be offset from the center of the video content. This can lead to situations where overlay content is mostly visible while most of the video content is not, and vice versa. Thus, the 50% criteria applied to in-line content may not provide an useful measure of overlay content visibility. Therefore, the core technical problem is that overlay content is shown in nested iframes, and interior iframes cannot determine their display real estate compared to the rest of the display viewport. Traditional implementations of overlay content visibility do not take into account whether the overlay content itself is visible, but instead whether or not the entire video block is visible. This results in a number of edge cases yielding false positives and false negatives. False positives occur when the overlay content is not visible, but is recorded as though it is; for example, where the majority of the video block is visible, but the lower portion of the video block where the overlay content is present is not visible. False negatives occur when the overlay content is visible, but is recorded as though it is not; for example, when the overlay content is visible, but most of the video block is scrolled off the display. Immersive videos, also known as "360 videos," can present additional challenges because the overlay content can be located in an area of the immersive video not currently displayed in the video block; that is, the overlay content can be outside of the video block as well as outside of the viewport.

The following disclosure therefore presents embodiments that provide for measurements including, without limitation:

Visibility measurement of overlay content within a video player.

Visibility measurement of videos with a lower resolution than the video player.

Visibility measurement of picture-in-picture content.

Visibility measurement of overlay content within immersive videos.

A system for measuring the visibility of overlay content may include several components. (1) A page rendering component that can identify a position of a video block with respect to a web page rendered on a client device, identify a portion of the web page visible in a viewport of the client device, identify a portion of the video block visible in the viewport, and pass data identifying the portion of the video block visible in the viewport to an interior element. (2) An element rendering component that can receive the data, identify a position of an overlay content item with respect to the video block, compare the position of the interior element to the portion of the video block visible in the viewport to determine a portion of the interior element that is visible in the viewport, determine whether the interior element meets a visibility threshold, and provide visibility data to a records server. In embodiments that generate visibility data for overlay content placed in immersive video, the element rendering component can identify a portion of the immersive video visible in the video block. (3) A records server that can record and use the visibility measurement data.

Accordingly, the embodiments of this disclosure can address the technical problems associated with measuring the visibility of overlay content in hosted video presented in a video block on a web page rendered on a client device with a finite viewport.

FIG. 1 is a block diagram depicting an example environment 100 for measurement of visibility of overlay content, according to an illustrative implementation. The environment 100 can include several computing device including a content publisher 150, a video host 155, a content provider 160, and a records server 165 interfacing with one or more client devices 110 via a network 105. Each of the content publisher 150, the video host 155, the content provider 160, and the records server 165 can include an individual computer or server, or multiple computers or servers. In the latter case, the multiple computers or servers can reside together in a single location such as a data center, or spread across multiple data centers. In some implementations, functions of the content publisher 150, the video host 155, the content provider 160, and the records server 165 can be combined in a single computing system; for example, in some implementations the functions of the content publisher 150 and the video host 155 can be performed by a single, shared server or data center.

The content publisher 150 can publish primary content including online resources such as web sites and other online documents, for viewing and use by client devices 110. The content publisher 150 can provide spaces or iFrames in a web page for various content. For example, a web page can include a video block for embedding streaming video. The video host 155 can provide the streaming video for display in the video block. The client device 110 can request primary content from the content publisher 150, and render the primary content for display using a browser application. To retrieve video content for display in the video block of the web page, the client device 110 can send a request to the content publisher 150 or the video host 155. The client device 110 can receive, in response to the request, the video content for display in the video block.

The video host 155 can provide streaming video for display in the video block of the web page. The video host 155 can receive video content uploaded by various entities including private individuals or commercial or non-profit organizations. The video host 155 can store the uploaded videos and stream them on command to various sites. The video host 155 can host its own website for displaying videos, and can additionally provide streaming video to other independent websites such as those provided by content publisher 150. The video host 155 can provide the video content via an embedded video player, video block, or plug in rendered in web pages provided by the content publisher 150.

The content provider 160 can provide content items for display with embedded videos. The content items can include in-line content and overlay content. In-line content can be displayed in place of the hosted video for a finite period of time in a manner analogous to a news flash, emergency broadcast, or commercial displayed during a traditional television broadcast. Overlay content can be displayed on top of the embedded video. Overlay content can include picture-in-picture video, a pop-up notification, or banner ad. The content provider 160 may not provide the content items directly to the client device 110. Rather, the content provider 160 may provide the content items to a content item distribution network. The content item distribution network may receive content items from many different content providers 160. The content item distribution network may provide content items to many different client devices 110. The content item distribution network may perform a selection process to determine which content item to provide in response to each request. The selection process may take into account various characteristics of the request, the content item, the embedded video, and the web page in which the content item will be displayed. The selection process may take into account compensation offered by the content provider 160, or an agent associated with the content provider 160, for display of the content item. The offer may be contingent upon the content item distribution network providing the content item to a client device 110. The offer may be contingent upon confirming that the content item has been made visible on the client device 110. In some implementations, functions of the content publisher 150, the video host 155, the content provider 160, and the records server 165 can be combined in a single computing system; for example, in some implementations the functions of the content publisher 150 and the video host 155 can be performed by a single, shared server or data center.

The client device 110 can request and render web pages received via a network 105. The network 105 can include any computer network including the Internet, a wide-area network, a local-area network, or a mobile data network. The client device 110 can include an end-user computing device such as a desktop computer, laptop computer, or mobile computing device such as a smart phone or tablet. The client device 110 can request a web page from the content publisher 150. The content publisher 150 can return a web page for rendering by the client device 110. The web page can include a video block for the display of an embedded video. The web page, when rendered, may cause the client device 110 to transmit a request to the video host 155 to provide video content for the video block. The web page may additionally cause the client device 110 to transmit a request to the content provider 160 for a content item for display with the video content. The client device 110 can render the content item in the video block.

The client device 110 can include several component for performing the operations of the system including a page renderer 120, an element renderer 125, a visibility calculator 130, a page communicator 135, an external communicator 140, and a memory 145. Each component of the system may be embodied in hardware of the client device 110, software executed by a processor of the client device 110, or combinations thereof.

The page renderer 120 can render the web page on the client computing device 110. The web page can include a video block for embedding streaming video into the web page. A portion or all of the rendered web page can appear in a viewport of the client device 110. The viewport represents the extent of rendered content made visible on a display of the client device 110. The page renderer 120 can determine a position of a video block with respect to the web page. For example, the page renderer 120 can determine the position in X-Y coordinates of a top-left corner of the video block relative to the top-left corner of the web page. The page renderer 120 can identify a portion of the web page visible in the viewport of the client device. Either or both of these may be done, in some implementations, by querying a display engine of the client device or operating system, or by querying the web browser via an API of the browser. For example, in one such implementation, the page renderer may determine, based on the page rendering instructions (e.g. HTML, Javascript, XML, stylesheets, etc.) that the video block is at a specified X-Y position within the page when rendered. In a similar implementation, the page renderer may request the X-Y position or coordinates of the video block within the page from the web browser (e.g. a rectangle from 40, 120 to 100, 220, indicating a block 60 pixels in width and 100 pixels in height). The page renderer may also request the X-Y coordinates of the viewport from the browser (e.g. a rectangle from 0, 0 to 140, 180, indicating a viewport 140 pixels in width and 180 pixels in height). The page renderer 120 can calculate a portion of the video block visible in the viewport based on the position of the video block and the portion of the web page visible in the viewport, such as by subtracting one set of coordinates from the other or determining an extent of collision between the two sets of coordinates. For example, given the above coordinates, the page renderer 120 may determine that the top half of the video block from 40, 120 to 100, 180 is visible by calculating the difference between the coordinates of the video block and viewport. For example, 140 pixels-100 pixels is positive, and therefore, the rightmost border of the video block is within the rightmost extent of the viewport. Similarly, 0 pixels-40 pixels is negative, so the leftmost border of the video block is to the right of the leftmost extent of the viewport; 0 pixels-120 pixels is negative and 180 pixels-120 pixels is positive, indicating that the topmost border of the video block is within the viewport extents; and 180 pixels-220 pixels is negative, indicating that the bottommost border of the video block is below the lower viewport extent. In other implementations, other calculations may be used. For example, in one implementation, the page renderer may determine or receive, via an API from the browser, coordinates of a first corner (e.g. upper left) of the video block and coordinates of an opposite corner (e.g. lower right) of the video block; and coordinates from the same first corner and opposite corner of the viewport. The page renderer may determine if a line between the diagonal corners or coordinates of the video block intersects a line between the diagonal corners or coordinates of the viewport. If so, the video block is fully displayed within the viewport. If not, at least a portion of the video block is off screen. In a further implementation, the video block and/or viewport may be divided into a set of subblocks (e.g. top 20%, next 20%, etc.), and diagonal lines between the corners of each subblock may be compared for intersections. This may allow efficient identification of how much of the video block overlaps with the viewport. In other implementations, the page renderer 120 may calculate the area of an intersection between the video block and viewport. The page renderer 120 can be in communication with the element renderer 125. The page renderer 120 can thus pass data identifying the portion of the video block visible in the viewport to the element renderer 125.

The element renderer 125 can render an interior element of the web page; for example, the video block. The element renderer 125 can receive, from the page renderer, the data identifying the portion of the video block visible in the viewport. The element renderer 125 can determine a position of an overlay content item with respect to the video block. For example, the element renderer 125 can determine the position of the overlay content item as a set of coordinates denoting the location of corners or edges of the overlay content item relative to the top-left corner of the video block. The element renderer 125 may determine the position of the overlay content item using any of the techniques discussed above, including retrieving coordinates via an API of the browser, etc. The element renderer 125 can calculate a portion of the overlay content item visible in the viewport by comparing the position of the overlay content item and the data identifying the portion of the video block visible in the viewport. The element renderer 125 can transmit an identification of the portion of the overlay content item visible in the viewport and a timestamp to a remote server, such as the records server 165, for recording an identification of overlay content item visibility.

In some implementations, the page renderer 120 can be configured to generate a first identifier, and transmit it to the records server 165. The element renderer 125 can be configured to generate a second identifier and transmit it to the records server 165. The records server 165 can combine visibility data from the page renderer 120 and the element renderer 125 based on matching the first identifier and the second identifier. In this manner, the records server 165 can correlate data received separately from the page renderer 120 and the element renderer 125.

In some implementations, the page renderer 120 and the element renderer 125 can execute instructions enabling each to identify the other. This can include generating, by the page renderer 120, a page identifier and/or an authenticated token, and transmitting one or both to the element renderer 125 along with the data identifying the portion of the video block visible in the viewport. In this manner, the element renderer 125 can confirm the data's validity.

In some implementations, the client device 110 can include a page communicator 135. The page communicator 135 can facilitate data communication between the page renderer and the element renderer. The page communicator 135 can perform identification and authentication operations for maintaining the integrity of data passed from the page renderer 120 to the element renderer 125.

In some implementations, the client device 110 can include an external communicator 140. The external communicator 140 can transmit the data identifying the portion of the overlay content item visible in the viewport and the timestamp to the records server 165. The external communicator 140 can perform identification and authentication operations for maintaining the integrity of visibility and timestamp data transmitted to the records server 165.

In some implementations, the video block can host an immersive video, otherwise known as "360 video." An immersive video can be acquired using a special camera or technique that can capture an image multiple directions, and combine them into a virtual viewpoint having visibility in each direction. A user can then navigate the immersive video my moving the virtual camera direction in multiple dimensions. For example, the user can adjust the view left, right, up, or down. When the user adjusts the view, out-of-view portions of the immersive view can be brought into the viewport of the client device 110. In this manner, the user can control which portion of the immersive video is visible within the viewport at any point in time. Implementations including immersive videos can present additional challenges for the measuring the visibility of overlay content. In particular, an overlay content item can be placed at any point within the immersive video, and not necessarily at a point in the immersive video that is visible in the viewport. The system therefore has to perform additional steps to determine the location of the overlay content within the immersive video, determine which portion of the immersive video is visible in the video block, and calculate a portion of the overlay content item visible in the viewport.

Accordingly, in some implementations involving immersive video, the element renderer 125 can be configured to determine a position of the overlay content item with respect to the immersive video, determine a portion of the immersive video visible in the video block, and calculate a portion of the overlay content item visible in the viewport. The element renderer 125 can calculate the portion of the overlay content item visible in the viewport by comparing the position of the overlay content item with respect to the immersive video, the portion of the immersive video visible in the video block, and the portion of the video block visible in the viewport. The element renderer 125 may use any of the techniques discussed above in connection with video blocks and viewports.

In some implementations, the client device 110 can include a visibility calculator 130. The visibility calculator 130 can be configured to calculate visibility ranges based on the portion of the overlay content item visible in the viewport. In some embodiments, visibility can be recorded as falling into buckets defined by a visibility duration corresponding to a percent of visibility. For example, overlay content measured as 100% visible may be recorded in a bucket for a 180-second visibility duration, while off screen overlay content may be recorded in a bucket for a 10-second visibility duration. The system may record visibility events in many buckets for analytics purposes, but only count events in certain buckets as "visible" for purposes of debiting and crediting accounts of various parties based on overlay content visibility; for example, the system may only consider an event "visible" if it falls into a bucket for 30 seconds or longer of visibility. In some embodiments, visibility can be based on other descriptions of visibility. For example, each bucket may describe which parts of the overlay content were visible. Overlay content visible in its entirety may be recorded in the 10-second bucket. Overlay content with only the title text on top may be recorded in the 3-second bucket.

The client device 110 can include a memory 145. The memory 145 can be implemented as a database or other data structure residing on a computer-accessible storage medium such as a hard drive, optical drive, random-access memory, solid-state drive, cloud storage, or the like. The memory 145 can store instructions that cause the client device 110 to execute the operations of the systems and methods described herein. The memory 145 can store position and visibility information. In particular, the memory 145 can store a record of a position of the outside of the page with respect to the viewport.

The records server 165 at can receive, record, and analyze the visibility measurement data received from the page renderer 120 and element renderer 125. The records server 165 can be a third-party service employed by the content publisher 150, video host 155, or content provider 160 to maintain an accounting of overlay content items displayed by client devices 110 (that is, a measurement that the overlay content item has appeared in the viewport of the client device 110).

In some implementations, the records server 165 can classify a visibility event as one of a plurality of predetermined classifications depending on the value of the measurement of overlay content item visibility. This operation can be similar to that described above for the visibility calculator 130. That is, the visibility can be recorded as falling into buckets defined by a visibility duration corresponding to a percent of visibility. In some implementations, the records server 165 can record an overlay content item as viewed if the measurement of overlay content item visibility exceeds a predetermined threshold; for example, 50%, 80%, or 100%.

Figure 2:
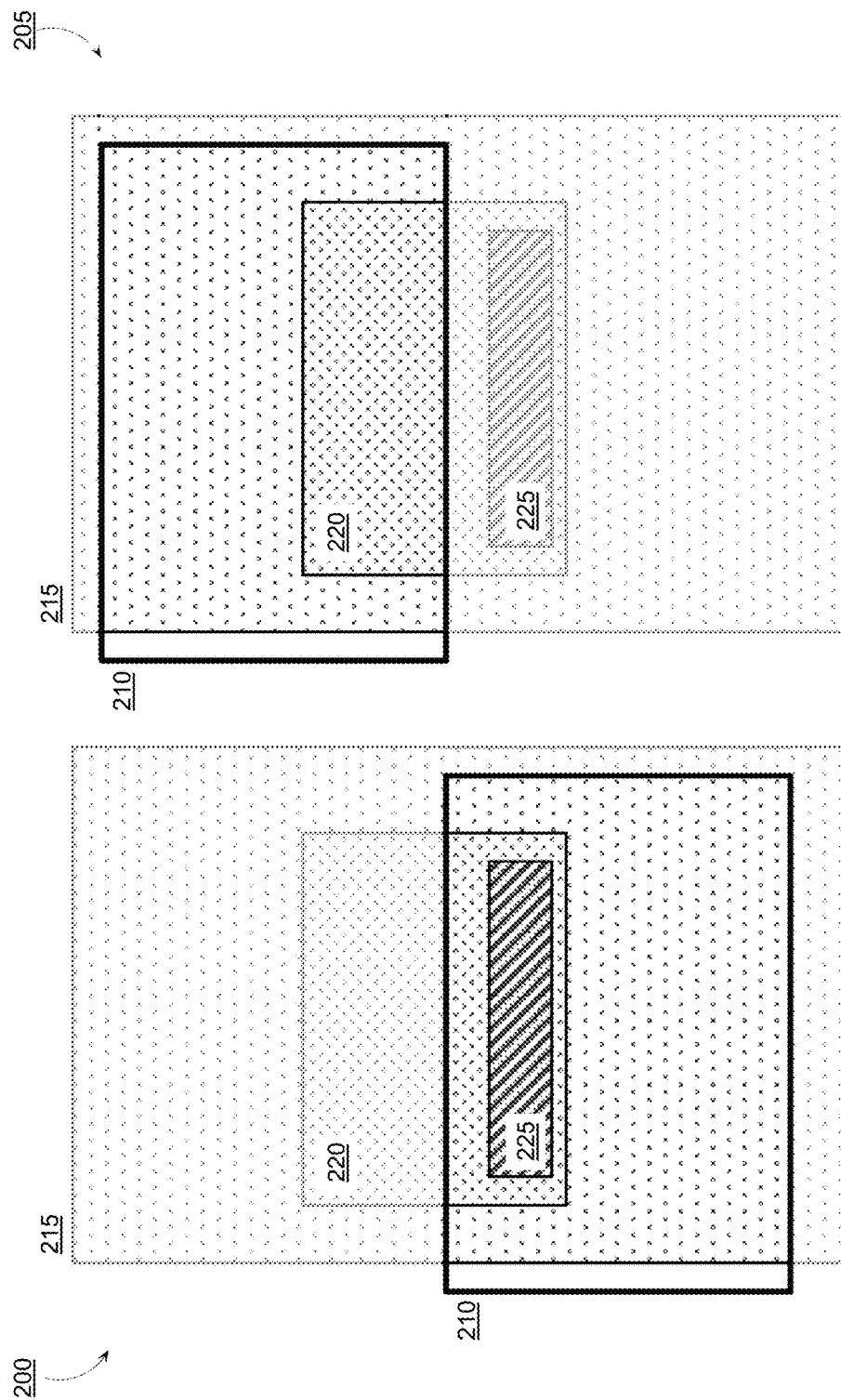
FIG. 2 is an example representation of layouts of web page elements in relation to a viewport of a client device, according to an illustrative implementation.

FIG. 2 is an example representation of layouts 200 and 205 of web page elements in relation to a viewport 210 of a client device 110, according to an illustrative implementation. The example layouts show a viewport 210 of a client device 110, the outline of a web page 215 rendered on the client device 110, an outline of a video block 220 rendered in the web page, and an overlay content item 225 rendered in the video block 220.

The layout 200 shows a situation in which the overlay content item 225 visible in the viewport 210, but most of the video block 220 is off screen. This situation could lead to a false negative measurement of overlay content item visibility if measurement of the visibility is based on the visibility of the video block 220. The situation in the layout 200 can occur frequently, and in particular when a user is using a video player to listen to music, but is uninterested in the accompanying video (which can often be a still image or blank). Moreover, the user may scroll down to view part of the rendered web page 215 below the video block 220 to read information or comments about the video.

The layout 205 shows a situation in which most of the video block 220 is on screen, but the overlay content item 225 lies outside of the viewport 210, and is thus not visible on the display of the client device 110. This situation could lead to a false positive measurement of overlay content item visibility if measurement of the visibility is based on the visibility of the video block 220.

Figure 3:
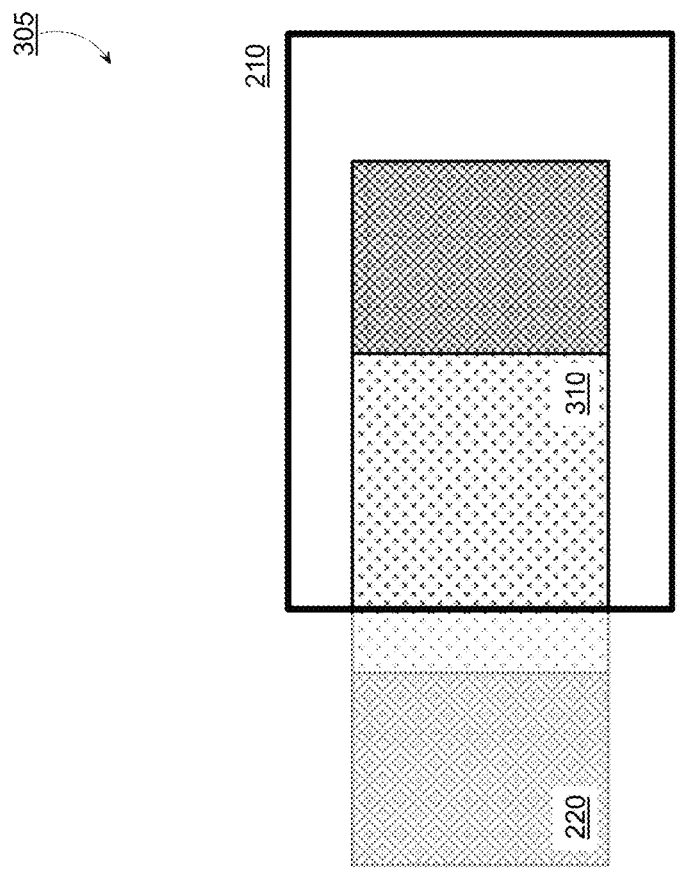
FIG. 3 is an example representation of layouts of web page elements in relation to a viewport of a client device, according to an illustrative implementation.
Figure 3:
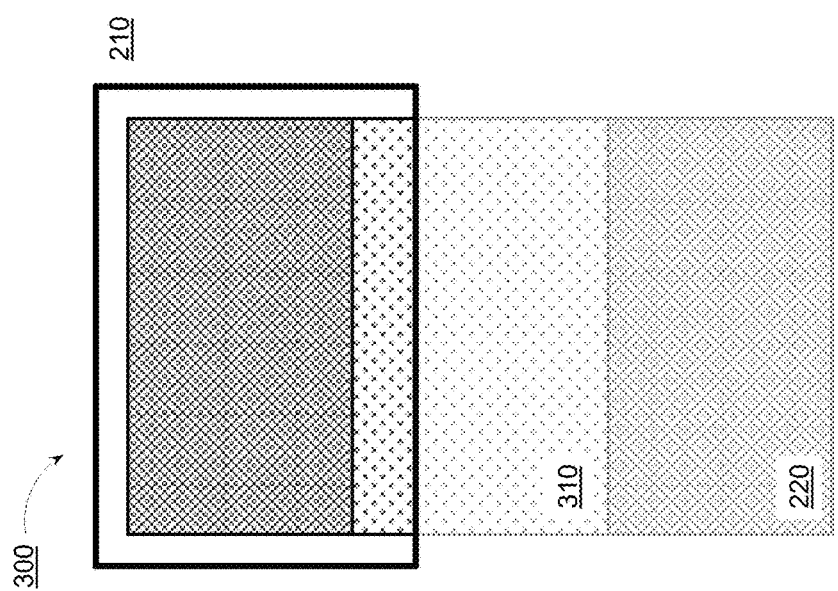

FIG. 3 is an example representation of layouts 300 and 305 of web page elements in relation to a viewport 210 of a client device 110, according to an illustrative implementation. The layouts 300 and 305 show how video content 310 can take up different portions of the video block 220; and, by extension, different portions of the screen when the video content 310 has a lower resolution or different aspect ratio from the video block 220. This can lead to inaccurate visibility measurements. To address these inaccuracies, the system can implement a 50% visibility criteria. The 50% criteria may not provide the most accurate measurement, but it can provide consistent measurements for video content and video blocks of varying aspect ratio. That is, if 50% of the video block is visible, then 50% of the video content should be visible as well. This may not hold true for different thresholds such as 75% or 25%.

The layout 300 shows a situation in which most of the video block 220 is outside of the viewport 210. The video content 310, centered within the video block 220, is also mostly outside of the viewport 210. The layout 305 shows a situation in which most of the video block 220 is inside the viewport 210. The video content 310, centered within the video block 220, is also mostly inside the viewport 210.

The layouts 300 and 305 show, however, that when 50% or more of the video block 220 is within the viewport 210, 50% or more of the video content 310 will also be within the viewport 210. As long as the video content 310 is centered within the video block 220, this relationship will hold true. As is also apparent, however, a 25% visibility criteria could yield false positive visibility measurements. This is because if only 25% of the video block 220 is visible in the viewport 210, it is possible that very little and perhaps none of the video content 310 is also visible in the viewport 210.

Because overlay content is generally not placed in the center of the video content 310 or the video block 220, the 50% criteria is less helpful for accurately measuring the visibility of the overlay content. Therefore, extra steps are required to determine the position of the overlay content within the video block 220, and the position of the video block 220 with respect to the part of the web page visible in the viewport 210.

Figure 4:
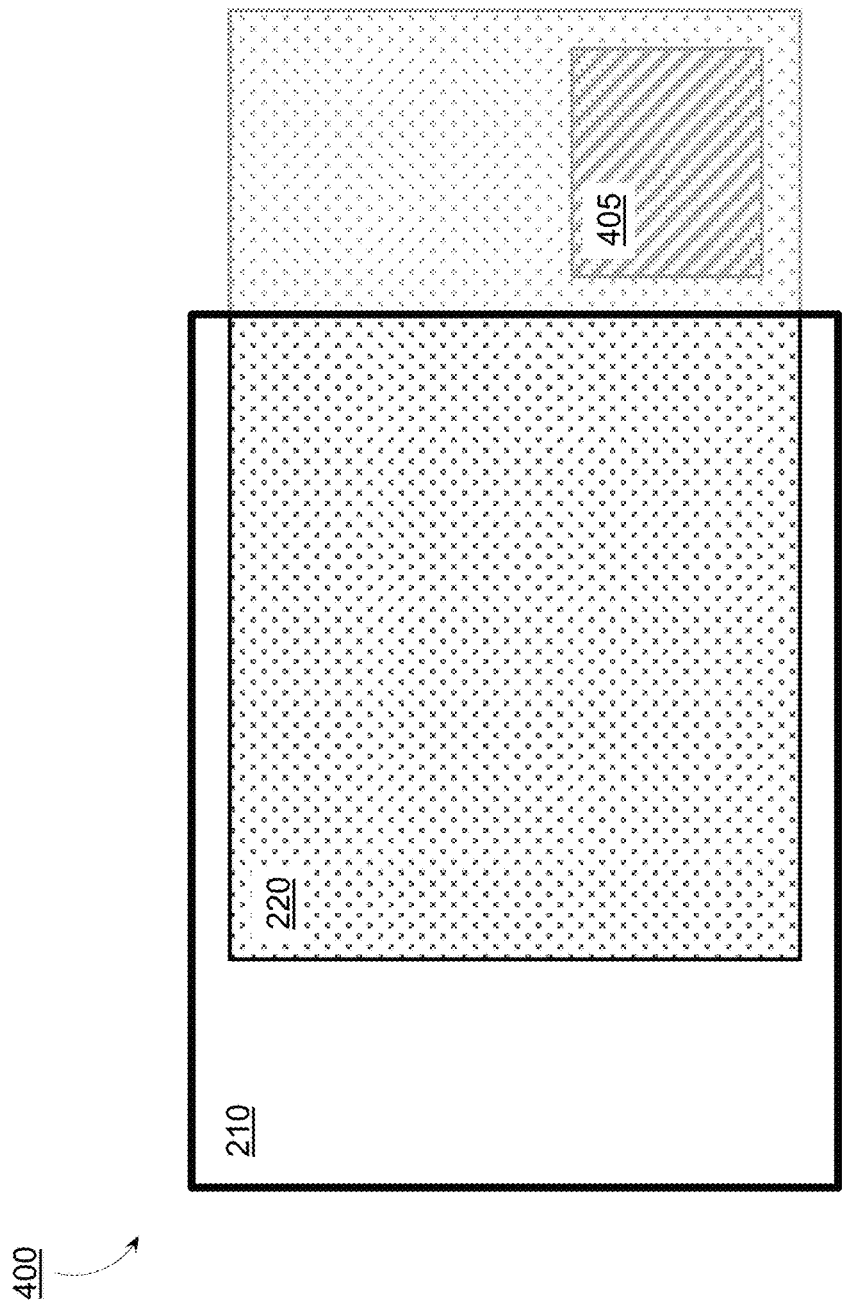
FIG. 4 is an example representation of a layout of web page elements in relation to a viewport of a client device, according to an illustrative implementation.

FIG. 4 is an example representation of a layout 400 of web page elements in relation to a viewport 210 of a client device 110, according to an illustrative implementation. The layout 400 illustrates a situation in which two videos are playing simultaneously. That is, the overlay content in the layout 400 is a picture-in-picture video 405 of the type that is popular, for example, for watching sporting events. In some cases, it may be desirable to measure the visibility of the picture-in-picture video 405. The visibility of the picture-in-picture video 405 can be measured according to the techniques discussed herein for other types of overlay content.

Figure 5:
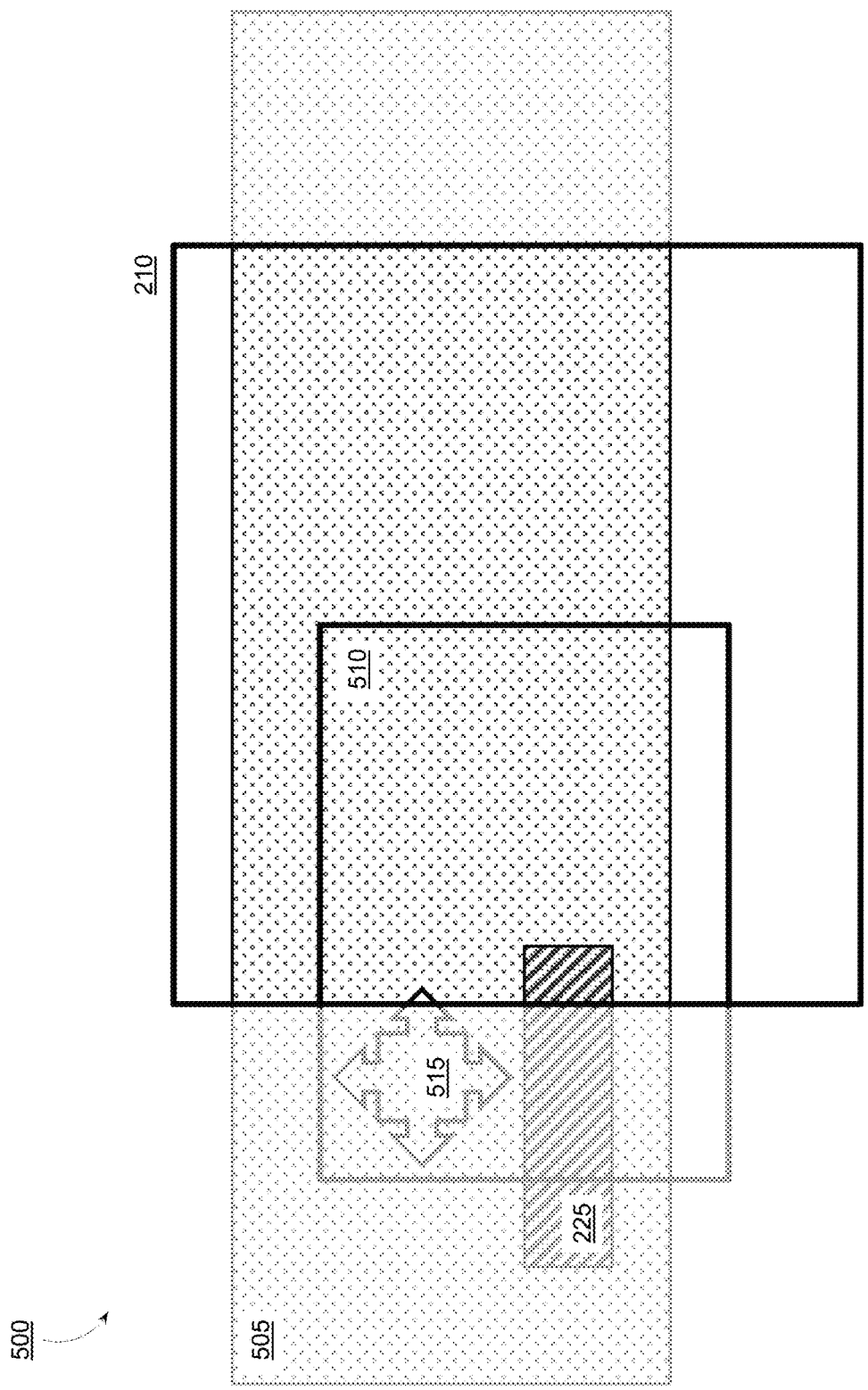
FIG. 5 is an example representation of a layout of web page elements in relation to a viewport of a client device, according to an illustrative implementation.

FIG. 5 is an example representation of a layout 500 of web page elements in relation to a viewport 210 of a client device 110, according to an illustrative implementation. The layout 500 illustrates an immersive video 505, or a "360 video." In the case of immersive video, only a portion of the immersive video 505 is visible in the video block viewport 510. The user can navigate to different portions of the immersive video 505 using the controls 515. Using the controls 515, the user can control which portion of the immersive video 505 is visible in the video block viewport 510.

The overlay content item 225 may be located anywhere within the immersive video 505. Therefore the overlay content item 225 may or may not be visible in the video block viewport 510. Moreover, the entire video block viewport 510 may not be visible in the screen viewport 210. Accordingly, the system may perform extra steps to calculate the relative positions of the overlay content item 225, the immersive video 505, the video block viewport 510, and the screen viewport 210.

Figure 6:
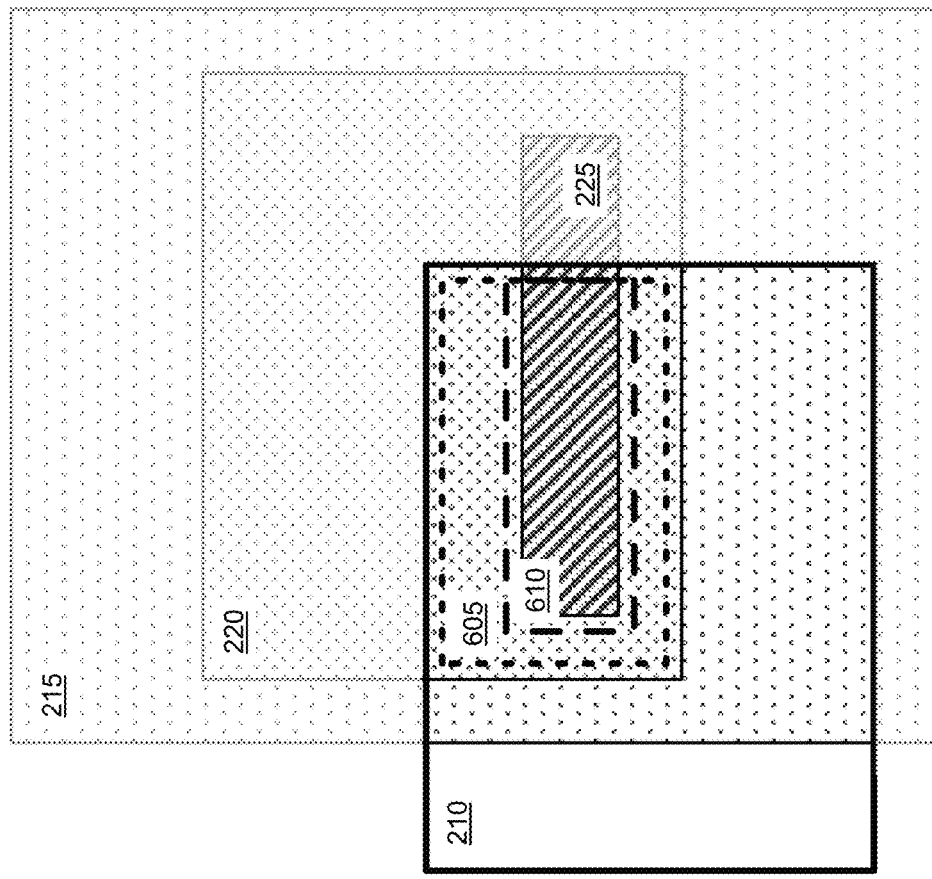
FIG. 6 is an example representation of a layout of web page elements in relation to a viewport of a client device, according to an illustrative implementation.

FIG. 6 is an example representation of a layout 600 of web page elements in relation to a viewport of a client device, according to an illustrative implementation. The layout 600 can illustrate an example operation for measuring the visibility of an overlay content item 225 in a viewport 210 of a client device 110.

The operation can begin when the client device 110 detects a view change event, such as an indication that an overlay content item 225 has been rendered in a web page 215 or an indication that the user has scrolled through the web page 215 to bring a different portion within the viewport 210. The system can determine a position of the video block 220 relative to the web page 215. The system can determine a position of the viewport 210 relative to the page. The system can combine the two positions to determine a portion 605 (dotted line) of the video block 220 visible in the viewport 210. The system can determine a position of the overlay content item 225 relative to the video block 220. The system can combine the position of the overlay content item 225 with the portion 605 of the video block 220 visible in the viewport 210 to calculate a portion 610 (dashed line) of the overlay content item visible in the viewport 210. The system can store a visibility measurement including the portion 610, a timestamp, and identifiers of the overlay content item 225, the web page 215, the video block 220, and/or the client device 110. The system can transmit the visibility measurement to the records server 165.

Figure 7:
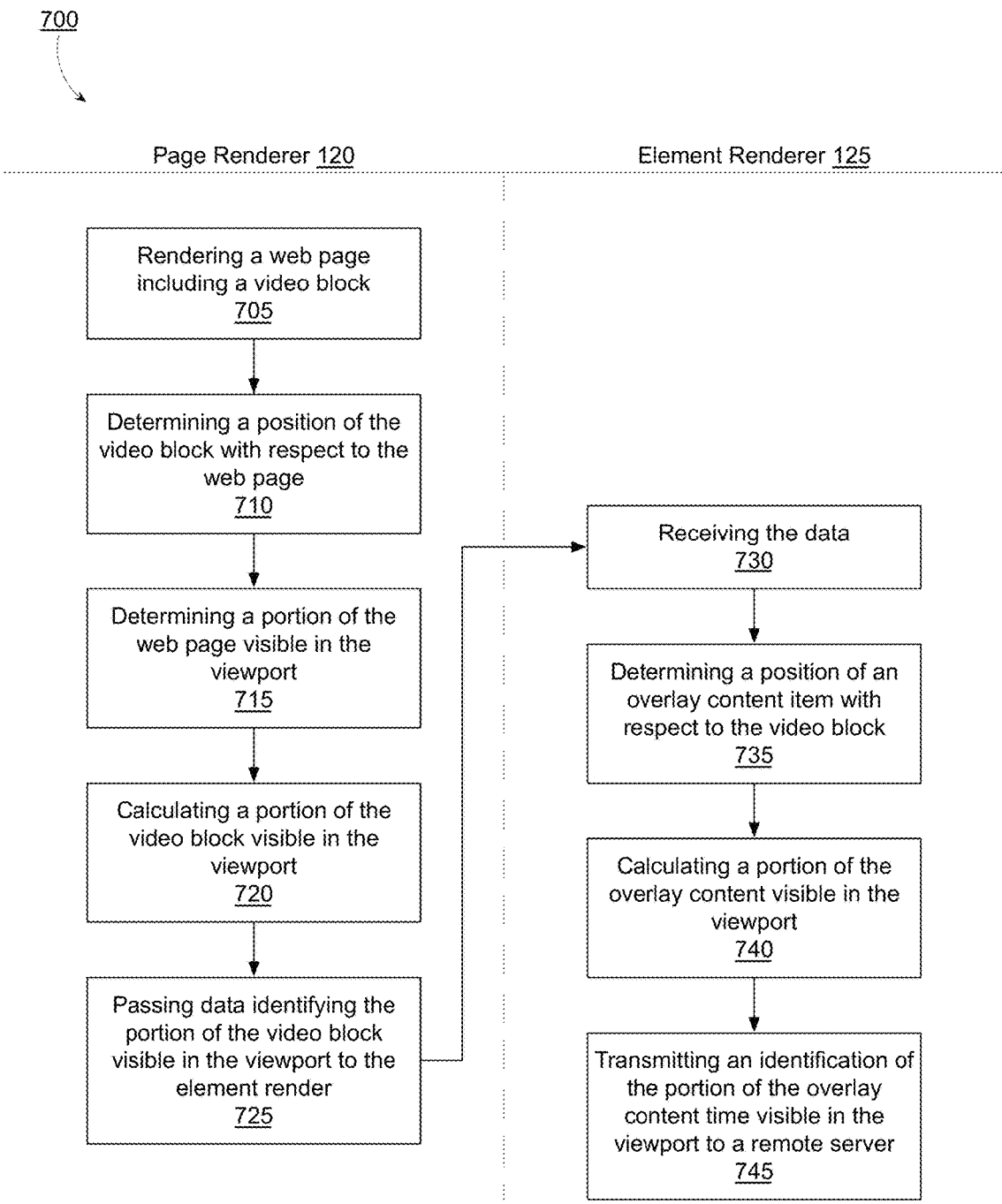
FIG. 7 is a flowchart illustrating an example method of measuring visibility of overlay content, according to an illustrative implementation.

FIG. 7 is a flowchart illustrating an example method 700 of measuring visibility of overlay content, according to an illustrative implementation. The method 700 can detect a position of content within nested frames in a computer display. The method 700 can be executed by the page renderer 120 and the element renderer 125 of the client device 110. The method 700 can include rendering a web page including a video block (step 705). The method 700 can include determining a position of the video block with respect to the web page (step 710). The method 700 can include determining a portion of the web page visible in the viewport (step 715). The method 700 can include calculating a portion of the video block visible in the viewport (step 720). The method 700 can include passing data identifying the portion of the video block visible in the viewport to the element render 125 (step 725). The method 700 can include receiving the data at the element renderer 125 (step 730). The method 700 can include determining a position of an overlay content item with respect to the video block (step 735). The method 700 can include calculating a portion of the overlay content visible in the viewport (step 740). The method 700 can include transmitting an identification of the portion of the overlay content time visible in the viewport to a remote server (step 745).

The method 700 can include rendering a web page including a video block (step 705). A page renderer 120 can be executed on a processor of the client device 110. The page renderer 120 can render a web page including a video block 210. In some implementations, the client device 110 can store a position of the outside of the page with respect to the viewport 220.

The method 700 can include determining a position of the video block with respect to the web page (step 710). The page renderer 120 can determine a position of the video block 225 with respect to the web page 215 using a piece of executable code or script. The position of the video block 225 can be represented by coordinates relative to an origin of the web page 215; for example, the top-left corner of the web page 215.

The method 700 can include determining a portion of the web page visible in the viewport (step 715). The page renderer can determine the portion of the web page 215 visible in a viewport 210 of the client device 210 using a piece of executable code or script. The portion of the web page visible can be represented by coordinates relative to the web page 215. The coordinates can denote the extent of the web page 215 visible in the viewport 210 by, for example, specifying the coordinates of each outside corner of the visible portion of the web page 215.

The method 700 can include calculating a portion of the video block visible in the viewport (step 720). The page renderer 120 can calculate the portion 605 of the video block 220 visible in the viewport 210 based on the position of the video block 220 and the portion of the web page 215 visible in the viewport 220.

The method 700 can include passing data identifying the portion of the video block visible in the viewport to the element render 125 (step 725). The page renderer 120 can pass data identifying the portion 605 of the video block 220 visible in the viewport 210 to the element renderer 125.

The method 700 can include receiving the data at the element renderer 125 (step 730). The element renderer 125 can receive the data identifying the portion 605 of the video block 220 visible in the viewport 210. In some implementations, the page renderer 120 and the element renderer 125 can execute instructions enabling each to identify each other. In some implementations, the client device 110 can include a page communicator 135 executed on the processor of the client device 110. The page communicator 135 can communicate data between the page renderer 120 and the element renderer 125.

The method 700 can include determining a position of an overlay content item with respect to the video block (step 735). The element renderer 125 can determine a position of an overlay content item 225 relative to the video block 220. The position of the overlay content item 225 can be represented by coordinates relative to an origin of the video block 220; for example, the top-left corner of the video block 220.

In some implementations, the method 700 can include operations for measuring the visibility of an overlay content item 225 located in an immersive video 505. The element renderer 125 can determine, a position of the overlay content item 225 with respect to the immersive video. The element renderer 125 can a portion of the immersive video 505 visible in the video block 510. The element renderer 125 can calculate a portion of the overlay content item 225 visible in the viewport 510 by comparing the position of the overlay content item 225 with respect to the immersive video 505, the portion of the immersive video 225 visible in the video block 510, and the portion of the video block 510 visible in the viewport 210.

The method 700 can include calculating a portion of the overlay content visible in the viewport (step 740). The element renderer 125 can calculate the portion 610 of the overlay content item 225 visible in the viewport by comparing the position of the overlay content item 225 and the portion 605 of the video block 220 visible in the viewport 210. In some implementations, the client device 110 can include a visibility calculator 130 executed on the processor of the client device 110. The visibility calculator 130 can calculate visibility ranges based on the portion 610 of the overlay content item 225 visible in the viewport 210. The visibility can be recorded as falling into buckets defined by a visibility duration corresponding to a percent of visibility. In some implementations, the records server 165 can record an overlay content item as viewed if the measurement of overlay content item visibility exceeds a predetermined threshold; for example, 50%, 80%, or 100%.

The method 700 can include transmitting an identification of the portion of the overlay content time visible in the viewport to a remote server (step 745). The element renderer 125 can transmit an identification of the portion 610 of the overlay content item 225 visible in the viewport 210 and a timestamp to the records server 165 for recording an identification of overlay content item visibility. In some implementations, the page renderer 120 can generate a first identifier and transmit it to the records server 165; and the element renderer 125 can generate a second identifier and transmit it to the records server 165. The records server 165 can combine visibility data from the page renderer 120 and the element renderer 125 based on matching the first identifier and the second identifier.

In some implementations, the records server 165 can classify a visibility event as one of a plurality of predetermined classifications depending on the value of the measurement of overlay content item visibility. For example, the records server 165 can record an overlay content item view if the value of the measurement of overlay content item visibility exceeds a predetermined threshold; for example, 50%, 80%, or 100%.

Figure 8:
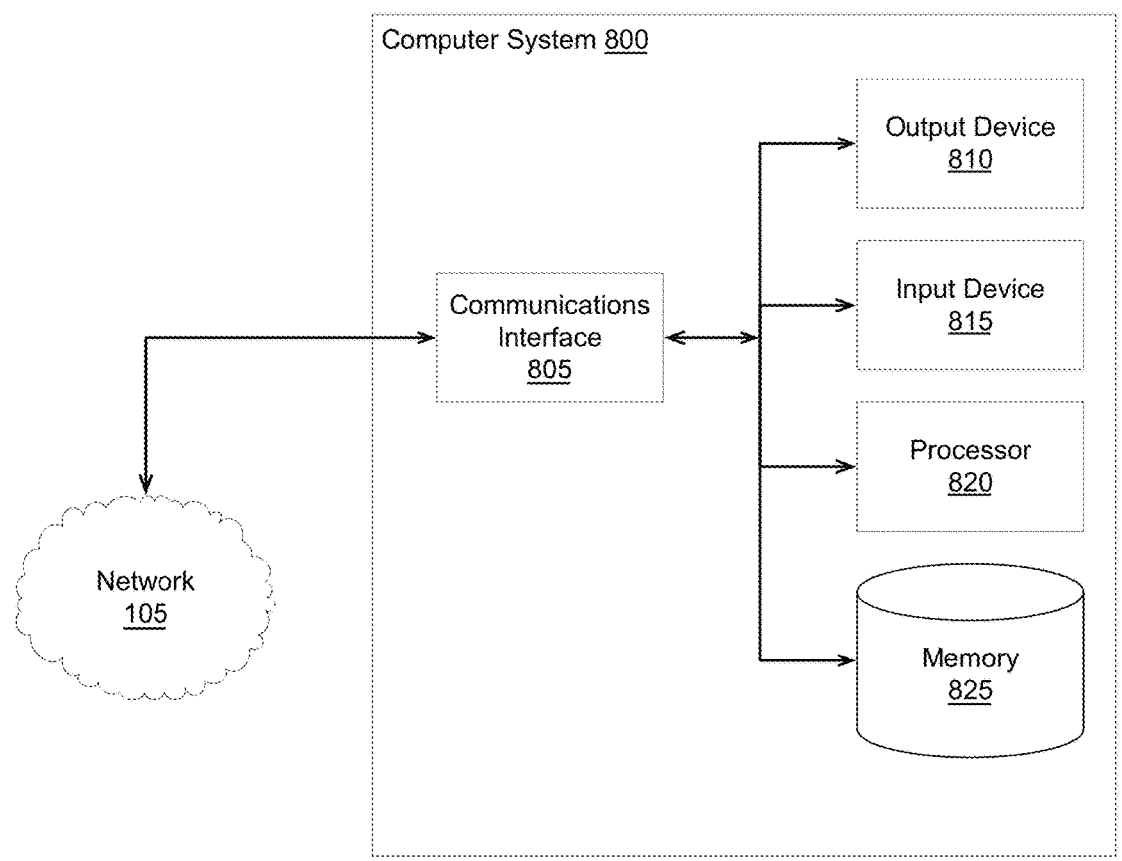
FIG. 8 is a block diagram illustrating a general architecture for a computer system that may be employed to implement elements of the systems and methods described and illustrated herein, according to an illustrative implementation.

FIG. 8 is a block diagram illustrating a general architecture for a computer system 800 that may be employed to implement elements of the systems and methods described and illustrated herein, according to an illustrative implementation (including the content publisher 150, the video host 1555, the content provider 160, the records server 165, and the client device 110 and components thereof including the page renderer 120, the element renderer 125, the visibility calculator 130, the page communicator 135, the external communicator 140, and the memory 145). The computer system 800 can be used to provide information via the network 105; for example, to provide content for display on the client device 110 via the network 105. The computer system 800 includes one or more processors 820 communicatively coupled to at least one memory 825, one or more communications interfaces 805, one or more output devices 810 (e.g., one or more display units) or one or more input devices 815 (e.g., one or more touchscreens, keypads, microphones, or the like).

The memory 825 can include computer-readable storage media, and can store computer instructions such as processor-executable instructions for implementing the operations described herein. The content publisher 150, the video host 1555, the content provider 160, the records server 165, and the client device 110 or the components of each can include the memory 825 to store the data received from the other devices. The at least one processor 820 can execute instructions stored in the memory 825 and can read from or write to the memory information processed and or generated pursuant to execution of the instructions.

The processors 820 can be communicatively coupled to or control the at least one communications interface 805 to transmit or receive information pursuant to execution of instructions. For example, the communications interface 805 can be coupled to a wired or wireless network, bus, or other communication means and can allow the computer system 800 to transmit information to or receive information from other devices (e.g., other computer systems). One or more communications interfaces 805 can facilitate information flow between the components of the environment 100. In some implementations, the communications interface 805 can (e.g., via hardware components or software components) provide a website as an access portal to at least some aspects of the computer system 800. Examples of communications interfaces 805 include user interfaces.

The output devices 810 can allow information to be viewed or perceived in connection with execution of the instructions. The input devices 815 can allow a user to make manual adjustments, make selections, enter data or other information, or interact in any of a variety of manners with the processor during execution of the instructions.

The subject matter and the operations described herein can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing system or apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The term "data processing system" or "computing device" "module" "engine" or "component" encompasses apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination thereof. The apparatus and execution environment can realize various different computing model infrastructures, such as web services, distributed computing and grid computing infrastructures. The client device 110 or components thereof can include or share one or more data processing apparatus, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the content publisher 150, the video host 1555, the content provider 160, the records server 165, and the client device 110) to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The environment 100 or system 800 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device 110 (e.g., a result of the user interaction) can be received from the client device 100 at the server (e.g., received by the records server 165).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the page renderer 120, the element renderer 125, the visibility calculator 130, the page communicator 135, the external communicator 140, or the memory 145 can be a single module, a logic device having one or more processing circuits, or part of one or more servers of the client device 110.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system for detecting a position of content within nested frames in a computer display, comprising:
   a client device comprising a processor and a computer-readable storage medium having instructions stored thereon executable by the processor to implement:
     a page renderer; and
     an element renderer;
   the page renderer configured to:
     render a web page including a video block on the client device,
     determine a position of the video block with respect to the web page,
     determine a portion of the web page visible in a viewport of the client device,
     calculate a portion of the video block visible in the viewport based on the position of the video block and the portion of the web page visible in the viewport, and
     pass data identifying the portion of the video block visible in the viewport to the element renderer; and
   the element renderer configured to:
     receive, from the page renderer, the data identifying the portion of the video block visible in the viewport,
     determine a position of an overlay content item with respect to the video block,
     calculate a portion of the overlay content item visible in the viewport by comparing the position of the overlay content item and the portion of the video block visible in the viewport,
     wherein the system transmits an identification of the portion of the overlay content item visible in the viewport and a timestamp to a remote server for recording an identification of overlay content item visibility.

2. The system of claim 1, wherein the video block hosts an immersive video, the element renderer configured to:
   determine a position of the overlay content item with respect to the immersive video,
   determine a portion of the immersive video visible in the video block, and
   calculate a portion of the overlay content item visible in the viewport by comparing the position of the overlay content item with respect to the immersive video, the portion of the immersive video visible in the video block, and the portion of the video block visible in the viewport.

3. The system of claim 1, wherein the page renderer and the element renderer execute instructions enabling each to identify the other.

4. The system of claim 1, wherein the remote server classifies a visibility event as one of a plurality of predetermined classifications depending on the value of the measurement of overlay content item visibility.

5. The system of claim 4, wherein the remote server records an overlay content item view if the value of the measurement of overlay content item visibility exceeds a predetermined threshold.

6. The system of claim 1, further comprising a visibility calculator executed by the processor, configured to calculate visibility ranges based on the portion of the overlay content item visible in the viewport.

7. The system of claim 1, further comprising a local storage device configured to record a position of the outside of the page with respect to the viewport.

8. The system of claim 1, further comprising a page communicator executed by the processor, configured to communicate data between the page renderer and the element renderer.

9. The system of claim 1, further comprising an external communicator configured to transmit the data identifying the portion of the overlay content item visible in the viewport and the timestamp to the remote server.

10. A method of detecting a position of content within nested frames in a computer display, comprising:
    rendering, by a page renderer executed by a processor of a client device, a web page including a video block;
    determining, by the page renderer, a position of the video block with respect to the web page;
    determining, by the page renderer, a portion of the web page visible in a viewport of the client device;
    calculating, by the page renderer, a portion of the video block visible in the viewport based on the position of the video block and the portion of the web page visible in the viewport;
    passing, by the page renderer to an element renderer executed by the processor of the client device, data identifying the portion of the video block visible in the viewport;
    receiving, by the element renderer from the page renderer, the data identifying the portion of the video block visible in the viewport;
    determining, by the element renderer, a position of an overlay content item with respect to the video block;
    calculating, by the element renderer, a portion of the overlay content item visible in the viewport by comparing the position of the overlay content item and the portion of the video block visible in the viewport; and
    transmitting an identification of the portion of the overlay content item visible in the viewport and a timestamp to a remote server for recording an identification of overlay content item visibility.

11. The method of claim 10, wherein the video block hosts an immersive video, the method comprising:
    determining, by the element renderer, a position of the overlay content item with respect to the immersive video,
    determining, by the element renderer, a portion of the immersive video visible in the video block, and
    calculating, by the element renderer, a portion of the overlay content item visible in the viewport by comparing the position of the overlay content item with respect to the immersive video, the portion of the immersive video visible in the video block, and the portion of the video block visible in the viewport.

12. The method of claim 10, wherein the page renderer and the element renderer execute instructions enabling each to identify the other.

13. The method of claim 10, wherein the remote server classifies a visibility event as one of a plurality of predetermined classifications depending on the value of the measurement of overlay content item visibility.

14. The method of claim 13, wherein the remote server records an overlay content item view if the value of the measurement of overlay content item visibility exceeds a predetermined threshold.

15. The method of claim 10, comprising:
    calculating, by a visibility calculator executed by the processor, visibility ranges based on the portion of the overlay content item visible in the viewport.

16. The method of claim 10, comprising:
    recording, by a local storage device of the client device, a position of the outside of the page with respect to the viewport.

17. The method of claim 10, comprising:
    communicating, by a page communicator executed by the processor, data between the page renderer and the element renderer.

18. The method of claim 10, comprising:
    transmitting, by an external communicator executed by the processor, the data identifying the portion of the overlay content item visible in the viewport and the timestamp to the remote server.

* * * * *